United States Patent [19]

Sugisawa et al.

[11] Patent Number: 4,645,681
[45] Date of Patent: Feb. 24, 1987

[54] PROCESS FOR PREPARING TOFU

[75] Inventors: Ko Sugisawa; Yasushi Matsumura, both of Nara; Kazumitsu Taga, Neyagawa; Koji Sengoku; Yoshiaki Nagatome, both of Nara, all of Japan

[73] Assignee: House Food Industrial Company, Limited, Higashiosaka, Japan

[21] Appl. No.: 706,333

[22] Filed: Feb. 27, 1985

[30] Foreign Application Priority Data

Mar. 15, 1984 [JP] Japan ................................. 59-49593

[51] Int. Cl.⁴ .............................................. A23L 1/20
[52] U.S. Cl. .................................... 426/634; 426/518
[58] Field of Search ............... 426/634, 656, 283, 518

[56] References Cited

U.S. PATENT DOCUMENTS 3,950,550 4/1976 Katayama et al. .................. 426/283

FOREIGN PATENT DOCUMENTS 58-134963 8/1983 Japan ................................... 426/634

Primary Examiner—George Yeung
Attorney, Agent, or Firm—Oblon, Fisher, Spivak, McClelland & Maier

[57] ABSTRACT

An improved process for preparing Tofu is provided using two steps. The steps involve (1) subjecting the curd to a crushing treatment that is carried out in the presence of a solution selected from the group consisting of soybean milk and an aqueous solution of isolated soybean protein, adding a coagulant to the solution containing the crushed curd before, during or after the crushing treatment; and (2) coagulating the solution containing the crushed curd and the coagulant by heating. The Tofu thus produced is of good texture, having good taste and good springiness.

10 Claims, No Drawings

PROCESS FOR PREPARING TOFU

BACKGROUND OF THE INVENTION (1) Field of the Invention

The present invention relates to a process for easily preparing Tofu, especially like Momen Tofu, i.e., soybean curds having moderately firm texture, good taste, good springiness and discontinuous construction, which are characteristics of Momen Tofu.

(2) Description of the Prior Art

So far, the Momen Tofu has been produced by transfering the curd, which is formed by adding coagulate agent to the soybean milk, into the container having some holes and thereafter, removing water from the curd by pressing, and has been sold by packing it in a small container after cutting it in a suitable volume.

However, the process described above was extremely inconvenient and it was difficult in obtaining packed Tofu having an excellent storability.

Accordingly, in order to solve the above problem, processes for preparing Tofu like Momen Tofu, such as a process comprising the steps of crushing the curd into small pieces, subjecting to add soybean milk thereto and making it coagulate by heating (Japanese Patent Publication No. 15141/1978), a process comprising the steps of dehydrating the curd, further adding soybean milk thereto and then making it coagulate by heating (Japanese Patent Laying-open No 154547/1977).

By the above improved processes, mechanization on the process for preparing Tofu can be accomplished and suitable storability can be given to the end products. The end products having discontinuous construction can also be obtained, however, the quality of the end products is not sufficient as Momen Tofu because of its being too rough as the end products.

SUMMARY OF THE INVENTION

Under such circumstances, the inventors conducted exhaustive studies toward the development of an industrially favorable method for easily preparing Tofu having good texture and good taste compared with conventional Momen Tofu and of a method being mechanized and thus, the present invention was accomplished. To begin with, the inventors found the problems on the feeling when the Tofu prepared by the process is eaten, which is mainly concerned with a difference between dry solids concentration of crushed curd and soybean milk added.

Thus, the inventors found that dry solids concentration included in the curd become much higher than the concentration of the same in the soybean milk added because of the water removing from the curd when the curd is crushed. The inventors also found that unnaturalness such as, roughness on the tongue is felt when the mixture is coagulated under remarkably difference of dry solid concentration.

Consequently, the inventors have studied to minimize a difference in the concentration between crushed curd and soybean milk to be added, and found that it is quite effective in crushing the curd in presence of soybean milk. That is, employing this crushing treatment causes the restraint of removing water from the curd and therefore, the crushed curd and soybean milk can be mixed under a state wherein remarkably difference in the concentration is almost nil and this mixture can be coagulated as a whole by subjecting it to the heating treatment and then, Tofu having sufficient texture as a Momen Tofu has thus been obtained.

The principal object of this invention is to provide a new industrially favorable, mechanizable and easy process for preparing Tofu like Momen Tofu without pressing treatment.

Other object of this invention is to provide Tofu like Momen Tofu having good texture, good taste, good springiness and agreeable to palate.

These and other objects of this invention are made clear hereunder.

DESCRIPTION OF THE PREFERRED EMBODIMENTS

The process according to the present invention will be described in more detail.

In the process of this invention, a coagulant is added to the soybean milk or the aqueous solution of the isolated soybean protein and the curd is produced thereby. The soybean milk may be prepared by a conventional process which comprises, for example, using whole soybean, dehulled soybean or defatted soybean as an ingredient and treating it according to the following series of process: ingredient→immersion in water→addition of water→grinding (to form slurry i.e., "GO")-→heating→isolation of lees of soybean→soybean milk.

In said process, it is desirable to apply heat treatment to the "GO", such as boiling, for about 30 seconds to 10 minutes at a temperature of about 80° to 100° C. Such heating is quite desirable for the reason that heat treatment causes a moderate denaturation of the soybean protein whereby the water retention of the final Tofu can be enhanced and the Tofu becomes agreeable to the palate.

However, if desired, the heating process may be omitted and the "GO" directly subjected to the separation process to form soybean milk. It is possible in the process of this invention to use the so-called powdered soybean milk prepared according to the process, such as described, by using a spray-drying technique or the like. In this case, the powdered soybean milk is preferably used in the form of solution prepared by dispersing and dissolving it into nonheat water or hot water.

The aqueous solution of the isolated soybean protein as used herein can be obtained by a conventional process which comprises, for example, adding a precipitant such as acids to soybean milk to precipitate soybean protein and then redispersing and redissolving the precipitate in water.

The concentration of dry solids in the soybean milk or the aqueous solution of isolated soybean protein (which are collectively called "soybean milks" hereunder) is used in the process of this invention. The standard concentration of dry solids of soybean milks is in the range of from 8 to 15%, preferably 10 to 12% and the product being agreeable to the palate is produced.

In the process of this invention, as a coagulant, there may be mentioned, for example any of the well-known coagulants for Tofu such as δ-gluconic lactones (hereunder referred to as G.D.L) and divalent metal salts such as calcium sulfate. These coagulants may be used singly or in combination. The coagulant is used according to a conventional method. That is, it may be used by directly mixing it with soybean milks or it may also be used in the form of a previously formed aqueous solution.

The amount of the coagulant is not limited. This is because it can be decided according to the compactness of Tofu produced or the concentration of dry solids in soybean milks. The G.D.L is used in the amount of 0.2 to 0.5% (by weight of soybean milks) preferably 0.25 to 0.35% whereby Tofu having good taste and a little hardness is obtained. Tofu having more agreeable to the palate like Momen Tofu is obtained by using said amounts of the coagulant.

On the other hand, if calcium sulfate is used as a coagulant, it is used in the amount of 0.25 to 8%, preferably 0.3 to 0.4%. If magnesium chloride is also used as a coagulant, it is used in the amount of 0.5 to 0.8%, preferably 0.6 to 0.7%.

According to the invention, the curd may be prepared by adding a coagulant to soybean milks. In this treatment, if it is necessary, it is desirable to make it coagulate by heating.

The preferable heat condition depends on the kind of the coagulant. Thus, it is a temperature of 80° to 90° C. for the G.D.L., a temperature of 70° to 80° C. for calcium sulfate, a temperature of 60° to 70° C. for magnesium chloride, respectively.

The heat treatment is carried out for about 20 to 30 minutes. To produce a curd having good gel construction is desirable in order to produce Tofu being agreeable to palate in any manner. However, where a coagulant is added to the soybean milks and temperature of the mixture is kept within the range of said temperature by heat generation, it is not necessary to apply heat treatment to the mixture. According to the invention, the procedure for preparing curd may be carried out on any scale such as in a tank or in a small container.

According to the present invention, the curd thus produced is subjected to put it with soybean milks. This treatment may be concretely carried out such as, (i) adding soybean milks to the curd in the tank or in the small container, or (ii) transferring the curd in the container in which the curd has been produced into other container and thereafter, adding soybean milks to the curd, or (iii) adding the curd into the container in which soybean milks has been discharged, i.e., this treatment is similar to the treatment (ii).

In the treatment (ii) or (iii), it is very important to transfer the curd into other container without breaking the coagulated state of the curd, i.e., transferring the curd so carefully that water doesn't remove from the curd during the transferring step.

In the process of this invention, any kind of soybean milks may be used the same as it was used in forming the curd. That is, the same one which was used on forming the curd may be used in this step and different one which is prepared in this step may also be used. It is the gist of the invention that the curd is crushed in the presence of soybean milks. This is because water included in the curd is scarecely removed by the crushing treatment and thereby, remarkably difference in the dry solids concentration is not occured and good Tofu is obtained.

It is desirable to use soybean milks of which solids concentration is from about 0.2 to 0.6% higher than that of concentration of soybean milks used for forming the curd and therefore, Tofu having more homogeneous construction may be obtained.

In this crushing step of the process of the invention, amount of the curd: soybean milks ratio may be changed widely. Generally speaking, the ratio is decided according to the desirable hardness of Tofu. A desirable ratio is from 2:8 to 7:3, and a ratio from 3:7 to 4:6 is also desirable in order to put the taste of Tofu close to Momen Tofu. One of the characters of the invention, as described above, is to crush the curd in the presence of soybean milks and in a concretely crushing treatment such as crushing it by agitating and mixing with an agitator, forcing a mixture of the curd and soybean milks pass through the plate having aperture or the metal seive having specific mesh, or combining said two treatments.

As for the degree of crushing the curd, it is desirable to crush the curd into pieces having an average square of between 2 to 10 mm so that taste like Momen Tofu and springiness may be given to Tofu.

It is not desirable that said pieces of the curd crushed become much smaller because roughness of Tofu thus produced is increased. On the other hand, it is not desirable, too that said pieces become much larger because taste like Momen Tofu decreases.

According to the present invention, water included in the curd is difficult to be removed during crushing process by using said crushing treatment and therefore, a remarkable difference in dry solids concentration is not occured between pieces of the curd crushed and soybean milks, and its homogeneous solids concentration works profitabily in the after-heating treatment. That is, the mixture is heated and coagulated as a whole and thereby, discontinuous construction like Momen Tofu, can be obtained and also, Tofu having good taste can be produced.

Further, according to the crushing treatment of the present invention, almost no air is mixed in the pieces of the curd crushed during the crushing treatment and roughness on the Tofu surface to be caused by air bubbles may be restrained and Tofu having a good external appearance may be obtained.

It is of other characters of the invention that a coagulant is added during, before or after the crushing treatment and subjected to coagulate it by heating.

As a coagulant used in this step, any coagulants may be used the same coagulants used in the step for forming the curd. The amount of coagulant the same in said step for forming the curd is preferable, too.

According to the process of the invention, it is desirable that a ratio of amount of a coagulant to soybean milks and kind of coagulant are used the same as in the step for preparing the curd and therefore, characters of Tofu like Momen Tofu may be increased.

As for the time when a coagulant is added to this step, it may be added in at least a step selected from the groups consisting of before, during and after the crushing treatment. However, where a coagulant is added before the crushing treatment, for example, a coagulant has already been added to soybean milk and rapid-acting coagulant such as calcium sulfate or magnesium chloride is used and, in order to carry out the discharging operation of soybean milks without coagulating soybean milks, it is desirable not to make curd by the treatment such as previously cooling the soybean milk or adding a retardant for coagulation such as polyphosphate.

According to the process of the invention, coagulate treatment by heating is carried out in the final stage. The treatment is carried out by heating the mixture itself or the mixture after discharging it into a small container such as heat-resistant plastic container and seal it.

Said coagulate treatment by heating may also be carried out by treatment such as sterilization with hot water or high temperature—high pressure treatment in retort. Conditions of said treatment may be employed freely by depending on the kind of a coagulant used or desirable degree of storability and is not restricted. However, as shown in a standard heat treatment condition, it is a temperature of about 60° to 135° C. for about 5 to 60 minutes. Generally speaking, on heat treatment, a coagulant of which coagulating temperature is low such as magnesium chloride is employed, production of "Su" (it means "open space" in Tofu) is increased so that it is desirable to rise the temperature moderately.

Tofu like Momen Tofu produced by the process of present invention has a good taste compared with Momen Tofu produced by employing the conventional pressing treatment. The characteristic properties of Tofu thus produced never lose even if it is cut or packed into a container.

Furthermore, according to the process of the invention, soybean milks is further added to Tofu produced by the process described above and then they are crushed again and subjected to a coagulate treatment by heating, thereby Tofu like Momen Tofu having better quality can be obtained, and this coagulate treatment may be continued further. Accordingly, this method is included in the technical scope of the present invention. However, said repeating treatment is not limited to only one treatment. The more said treatment be repeated, the better quality Tofu produced has.

As the present invention describes in detail, Tofu having good texture, and good taste like Momen Tofu may be obtained by the process of the present invention, in which a process for making Tofu can be mechanized and can easily be carried out. Especially, in the type of Tofu packed in the container, Tofu like Momen Tofu thus produced may have a better quality than conventional products.

The present invention will now be illustrated more concretely by referring to the following nonlimitative examples together with comparative examples.

EXAMPLE 1

Whole soybean were soaked in water and ground after addition of water. The resulting "GO" was subjected to centrifugal separation to remove the lees of soybean and soybean milk having a dry solids concentration of 10.5% was obtained. The soybean milk thus obtained was charged into a reserve tank for coagulation and 0.25% (relative to the weight of the soybean milk used) of G.D.L as a coagulant was added thereto after it was boiled for 1 to 2 minutes. The mixture was left to stand for 20 minutes to form curd.

The G.D.L 0.25% (relative to the weight of the soybean milk used) was then added to the same kind of soybean milk (had been boiled) as used above and the mixture having three times amounts by weight of the curd was added into said reserve tank. After the procedure, the curd was crushed by agitation to crush it into pieces having an average square of between about 2 and 10 mm (the dry solids concentration of the pieces was 10.6%).

The mixture of the pieces of the curd and the soybean milk was then charged into heat-resistant plastic container and sealed and was subjected to be heated and coagulated in hot water having a temperature of 85° C. for 40 minutes and thereafter, Tofu like Momen Tofu of the present invention was obtained (Sample A).

EXAMPLE 2

The curd was obtained by the some procedures as set forth in Example 1.

The same kind of soybean milk as used in Example 1 was added to the curd in the resurve tank. In this case, the soybean milk of which dry solids concentration is 10.9%, having three times amounts by weight of the curd and including no coagulant, was used. After the procedure, the curd was crushed by agitation to crush it into pieces having an average square of between about 2 and 10 mm (the dry solids concentration of the pieces was 10.7%).

The G.D.L. 0.25% (relative to the weight of the soybean milk used) was then added to the mixture of the pieces of the curd and the soybean milk to mix them and thereafter, the mixture was charged into a heat-resistant plastic container and sealed. The mixture was then heated and coagulated by the same procedure as set forth in Example 1, and Tofu like Momen Tofu of the present invention was obtained (Sample B).

EXAMPLE 3

The mixture of the pieces of the curd and soybean milk obtained by the same procedures as set forth in Example 1 was heated and coagulated in the reserve tank by heating it at 85° C. for 40 minutes.

The G.D.L 0.25% (relative to the weight of the soybean milk used) was then added to the same kind of soybean milk by the same procedures as set forth in Example 1 and the mixture having three times amounts by weight of the coagulated above was added to it in the reserve tank. After the procedure, the coagulated was crushed by agitation to crush it into pieces having square of between about 2 to 10 mm.

The mixture of the pieces of the coagulated and soybean milk was then charged into the container and sealed and was subjected to be heat and coagulated by the same procedures as set forth in Example 1 and thereafter, Tofu like Momen Tofu of the present invention was obtained (Sample C).

COMPARATIVE EXAMPLE 1

The curd was produced by the same procedures as set forth in Example 1 and the curd was crushed into pieces having average square of between about 2 and 10 mm (the solid concentration of the pieces of the curd rised to 11.6% by removing water from the curd during crushing treatment).

The pieces of the curd was then charged into the heat-resistant plastic container. The G.D.L was mixed to soybean milk (its dry solids concentration is 10.5%) produced by the same procedures as set forth in Example 1 and the mixture having three times amounts by weight of the pieces of the curd was added into the container and mixed. After the procedure, the container was sealed and the content of the container was heated and coagulated in the heated water at 85° C. for 40 minutes and thereafter, Tofu was obtained (Sample D).

COMPARATIVE EXAMPLE 2

The crushing treatment of the curd was carried out by the same procedure as set forth in Comparative Example 1. The pieces of the curd thus obtained was then discharged into the container provided with a proper number of holes on the side walls and was subjected to pressing treatment to remove water from the pieces of the curd (the dry solids concentration in the pieces was raised to 12.7% by removing water from it during the crushing and pressing treatments). Further, said pieces of the curd was charged into the container by the same procedure as set forth in Comparative Example 1 and soybean milk (the dry solids concentration was 10.5%) was added thereto. After mixing it, Tofu was obtained by heating and coagulating treatments (Sample E).

COMPARATIVE EXAMPLE 3

Momen Tofu was produced by the conventional method (Sample F). That is, Calcium sulfate (0.35% relative to the weight of soybean milk used) was mixed to soybean milk produced by the same procedures in Example 1 and the mixture was kept at 70° C. for 20 minutes. The curd thus produced was dipped up with a metal ladle and discharged into the box (350×300×150 mm) of which inside was covered with cloth and which was prepared with a proper number of holes on the side and bottom walls. Boards were then put on the curd and the curd was pressed at 5 kg for 20 minutes and thereafter, water on the curd was removed. It was charged into the heat-resistant plastic container after Momen Tofu thus produced was cut into suitable pieces. The container was filled with cold water and sealed. Tofu (Sample F) was then produced by the same heat treatment as in Example 1.

The samples obtained above were examined for properties such as appearance (a section of Tofu was examed according to its gloss), springiness, crumbliness or coarseness.

All properties except for appearance were examined by sensory tests. The results obtained are listed in the following Table 1.

TABLE 1

| Sample | Appearance | Springiness | Crumbliness | Roughness on the tongue |
|---|---|---|---|---|
| A | having gloss, excellent | springy excellent | not at all | not sensible |
| B | having gloss, excellent | homogeneous, springy, good | " | " |
| C | having gloss, excellent | homogeneous, springy, good | " | " |
| D | having less gloss, many marks of air on the surface | less sensible | strong | much |
| E | no gloss, many marks of air on the surface | less sensible | less strong | much, disagreeable to the palate |
| F | good | extremely hard, no springiness | " | less sensible |

As is obvious from the foregoing results, samples A, B and C according to the process of the invention were excellent in all properties which are important to decide the properties of Momen Tofu and they are also superior to comparative samples D–F.

What is claimed is:

1. A process for preparing Tofu which comprises forming curd by adding a coagulant to a solution selected from the groups consisting of soybean milk and an aqueous solution of isolated soybean protein, subjecting the curd to a crushing treatment which is carried out in the presence of a solution selected from the group consisting of soybean milk and an aqueous solution of isolated soybean protein to crush the curd into pieces having an average square of between 2 to 10 mm, adding a coagulant to the solution containing the crushed curd before, during or after the crushing treatment and then coagulating the solution containing the crushed curd and the coagulant by heating.

2. A process as set forth in claim 1 wherein the dry solids concentration of a solution selected from the group consisting of soybean milk and an aqueous solution of isolated soybean protein used for forming curd is 8 to 15% by weight.

3. A process as set forth in claim 1 wherein the coagulant is δ-gluconic lactone and the amount thereof is 0.2 to 0.5%.

4. A process as set forth in claim 1 wherein the coagulant is calcium sulfate and the amount thereof in 0.25 to 0.6%.

5. A process as set forth in claim 1 wherein the coagulant is magnesium chloride and the amount thereof is 0.5 to 0.8%.

6. A process as set forth in claim 1 wherein the dry solids concentration of a solution selected from the group consisting of soybean milk and an aqueous solution of isolated soybean protein added to the curd is 0.2 to 0.6% higher than that of concentration of a solution selected from the group consisting of soybean milk and an aqueous solution of isolated soybean protein used for forming curd.

7. A process as set forth in claim 1 wherein amount of the curd: amount of a solution selected from the group consisting of soybean milk and an aqueous solution of isolated soybean protein ratio is 2:8 to 7:3 by weight in the crushing treatment.

8. A process as set forth in claim 7 wherein the ratio is 3:7 to 4:6 by weight.

9. A process as set forth in claim 1 wherein the coagulant used for forming curd and the coagulant added to the solution containing the crushed curd is of the same kind.

10. A process as set forth in claim 1 wherein the solution containing the crushed curd is heated at 60° to 135° C. for 5 to 60 minutes.

* * * * *